Figure 1:
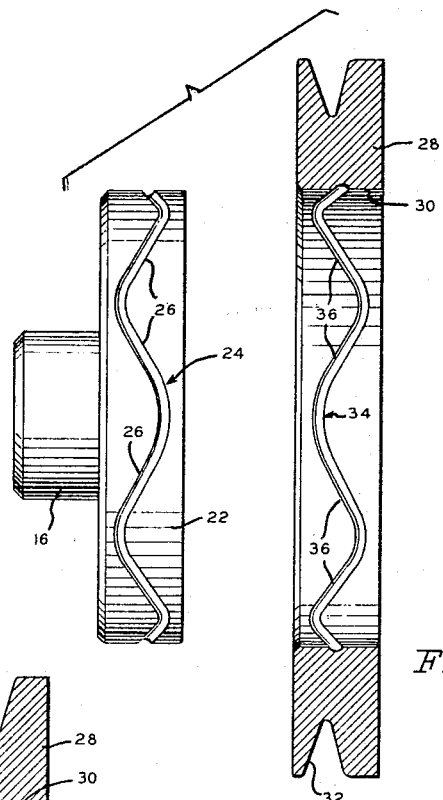

Oct. 25, 1966     H. P. ARNT, JR     3,280,654
VIBRATION DAMPER
Filed Aug. 2, 1965

INVENTOR
HERALD P. ARNT JR.
BY *Beaman & Beaman*
ATTORNEYS 3,280,654
VIBRATION DAMPER
Herald P. Arnt, Jr., Litchfield, Mich., assignor to Simpson Manufacturing Company, Litchfield, Mich., a corporation of Michigan
Filed Aug. 2, 1965, Ser. No. 476,616
9 Claims. (Cl. 74—574)

This application is a continuation-in-part of my copending United States application, Serial No. 133,409, filed August 23, 1961, now abandoned, which is a continuation-in-part of my United States Patent 3,088,332.

The invention relates to vibration dampening and absorbing devices, and particularly relates to dampening devices for crankshafts of internal combustion engines and other rotating members.

The invention is directed to a type of vibration dampening member which is widely employed in the automotive field for the dampening of engine crankshaft vibrations. This member is normally associated with the front end of the crankshaft, is usually exteriorly mounted directly to the crankshaft, and often includes pulley components for driving association with the generator, pumps, and other equipment. Such vibration dampeners usually consist of a hub member keyed to the crankshaft and an inertia member circumscribing the hub member and mounted thereon by vibration dampening means. The vibration dampening means usually takes the form of a layer of elastic material, and it is with this type of apparatus that the invention is concerned.

The hub member is normally provided with a cylindrical outer surface concentric with the axis of the crankshaft, and the inertia member is also provided with a concentric surface adapted to be related in concentric, spaced, opposed relationship to the hub outer surface. The elastic material is interposed between the hub and inertia member surfaces. The elastic material usually comprises a rubber ring which is forced between the aforementioned surfaces under tension wherein the tendency of the rubber material to return to its normal configuration is resisted by the confining hub and inertia member surfaces. Thus, the forces within the resilient member maintain an effective frictional engagement with the surfaces and, in effect, bond the rubber to the hub and inertia, member, maintaining the assembly of these components.

The aforementioned patent is concerned with grooves, ribs, and holes defined on the hub and inertia member surfaces engaged by the elastic material which form abutment shoulders, which cooperate with the elastic material to place portions of the elastic material in shear relation if relative movement between the hub and inertia member attempts to take place in an axial direction with respect to the axis of hub rotation.

The present invention relates to depressions or ribs defined on the hub and inertia members surfaces engaged by the elastic material to form abutment shoulders for producing a shear relation within the elastic material when relative angular rotation, about the axis of hub rotation, tends to occur between the hub and inertia member as well as resist relative axial movement between these components.

In that the rotative vibrational forces imposed upon a crankshaft tend to rotate the inertia member relative to the hub, and also as the inertia member is often employed as a pulley, there is a tendency for the inertia member to angularly "creep" relative to the hub and if this "creeping" occurs and continues, damage to the resilient member and reduction of its assembly-maintained characteristics will occur with the likelihood of the inertia member completely disengaging from the hub. In the practice of the invention, such angular creeping of the inertia member relative to the hub is resisted by means defined on either the hub or inertia member, or both, which coacts with the elastic material to place the same under shear should the inertia member rotate relative to the hub. Also, in the practice of the invention, axial creeping of the inertia member relative to the hub will be effectively resisted.

It is, thus, an object of the invention to provide a vibration dampener having an axis of rotation and consisting of a plurality of parts interconnected by an elastic member having frictional engagement with the parts wherein means are provided for resisting relative rotation between the parts about the axis of rotation, and such means also function to resist axial displacement of such parts.

A further object of the invention is to provide a rotating vibration dampener consisting of a hub component and an inertia component assembled by an elastic member interposed therebetween wherein economically produced means are provided on the members for placing portions of the elastic member in shear relation upon a tendency for rotative or axial displacement between the intertia and hub members.

Figure 3:
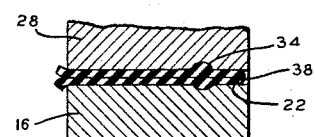
Figure 4:
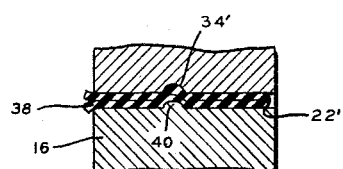
Figure 2:
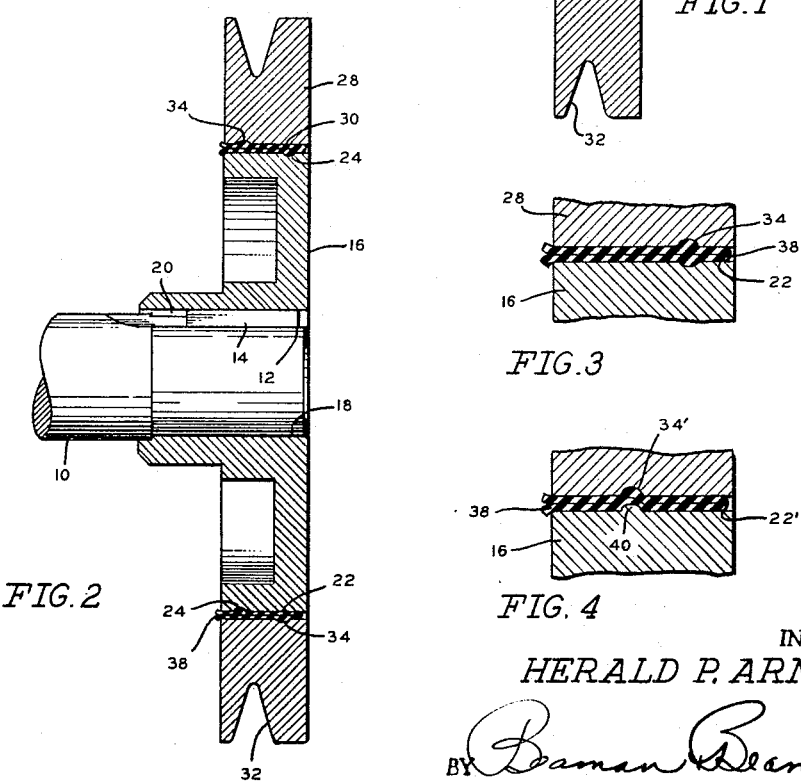

These and other objects of the invention arising from the details and relationships of the components of embodiments thereof will be apparent from the following description and accompanying drawings wherein:

FIG. 1 is an elevational, partly sectional view of the inertia and hub members of a vibration dampener in accord with the invention prior to assembly, FIG. 2 is an elevational sectional view of a vibration dampener in assembled relation in accord with the invention, FIG. 3 is an enlarged detail sectional view of an embodiment of the invention wherein the grooves defined upon the hub and inertia member are in opposed aligned relation, and FIG. 4 is an elevational enlarged sectional detail view of another embodiment of the invention wherein a rib member is employed upon the hub member.

The assembled form of the components of a vibration dampener in accord with the invention will be best appreciated from FIG. 2, wherein the crankshaft or other rotating shaft being dampened is indicated by reference 10. Shaft 10 is provided with a key way 12 into which a key 14 may be received. A hub member 16 having a bore 18 concentrically defined therethrough is mounted on the end of the shaft 10 and the bore 18 is provided with a key way 20 for cooperation with the key 14 to angularly affix the hub to the shaft.

The configuration of the hub member is illustrated in a simplified form, and in actual practice may include spoke elements and cut out portions to reduce the weight and reduce manufacturing costs. The hub periphery is provided with an outer surface 22 which is concentric with the axis of rotation of the shaft 10 and the hub bore 18. Outer surface 22 is normally cylindrical, as illustrated. In the practice of the invention, the surface 22 is provided with means for forming radially extending abutment shoulders upon the surface, or adjacent thereto, for cooperation with the elastic vibration-absorbing member. In the embodiments of FIGS. 1 and 2 this means takes the form of a sinuous groove or recess 24 which is preferably of a sinusoidal configuration which continuously extends around the hub member surface 22 in a circumferential manner having radially extending edge portions adjacent the surface 22. It will be appreciated that portions 26 of the sinuous groove 24 are obliquely disposed to the axis of the hub bore 18 and to a plane perpendicular to the hub bore axis passing through surface 22.

The inertia member 28 is of annular configuration having an inner surface 30 conforming in configuration to the hub surface 22. The diameter of the inertia surface 30 is larger than that of the hub surface 22 wherein upon inserting the hub surface 22 into the inertia member in opposed relation to the surface 30, an annular radial spacing between the opposed surfaces will exist. Preferably, this radial spacing is approximately .100 inch in most commercial embodiments of the invention. The inertia member 28 may include a pulley or sheave groove 32 for driving association with a generator belt or the like. In the embodiment of FIGS. 1 and 2, the inertia surface 30 is provided with a continuous sinuous groove or recess 34, preferably of a sinusoidal configuration, of an amplitude substantially equal to the width of the inertia member and including portions 36 obliquely disposed to the axis of the surface 30.

The elastic member 38, FIG. 2, which is interposed between the surfaces 22 and 30 under tension is usually formed of rubber, or a similar material, and may take the form of an annular band which is folded back upon itself and forced into the spacing between the surfaces upon the hub and inertia member surfaces being axially aligned in opposed relation. The means for assembling and tensioning the elastic means forms no part of this invention, and may be accomplished in the manner disclosed in U.S. Patent 2,795,036. Once the elastic member is interposed between the hub and inertia surfaces under tension, the resilient characteristics of the material tend to return the material to its free form. However, as the radial spacing between the surfaces is less than the normal or nontensioned radial thickness of the elastic member, the elastic member is maintained in a continuous tensioned state. In such a tensioned state the elastic member is maintained in intimate and high friction engagement with the inertia and hub member surfaces. By way of example, when the radial spacing between surfaces 22 and 30 is about .100 inch, an elastic member having a normal radial dimension of about .140 inch is forced between the surfaces.

As shown in FIG. 2, the tendency of the resilient material to assume its normal state will cause the elastic rubber to flow or expand into the grooves 24 and 34, and the grooves are of such a depth, usually approximately .020 inch, that the elastic material received therein is under only a small degree of tension, if any. Thus, it will be appreciated that as the edges of the grooves 24 and 34 adjacent the associated surfaces define abutment shoulders extending in a radial direction, the portions of the elastic material received within the grooves will be placed in a positive shear relation to the remainder of the elastic material upon any tendency of the inertia member 28 to rotate relative to the hub or move in an axial direction thereto. The groove portions 26 and 36 which extend obliquely to the axis of rotation and planes perpendicular thereto, will provide shear resistance in both angular and axial directions due to the oblique relationship of the groove portion.

Preferably, in assembling the hub and inertia members, the respective grooves thereof are misaligned such that the grooves will not be in opposed axial relation. This relationship insures that the grooves will be filled with the elastic material and distributes the shear forces imposed upon the elastic materal. The configuration of the grooves 24 and 34 need not be identical. However, it is preferred that the grooves be sinusoidal and in most instances will be approximately similar in amplitude and frequency.

FIG. 3 discloses an embodiment of the invention wherein the grooves 24 and 34 are of similar configuration, and the hub and inertia members are angularly related wherein the grooves associated therewith are in directly opposed relation. While this embodiment incorporates the inventive concept, it is not as desirable as the embodiment of FIGS. 1 and 2, as special orientation of the hub and inertia members during assembly is necessary.

The sinusoidal groove or recess configuration is preferable over other types of groove configurations which may also provide a resistance to both axial and angular displacement for several reasons. A sinusoidal groove may be readily machined in a turning operation and may be performed on the same lathe-type machine used to machine surfaces 22 or 30 without requiring a further operation or additional chucking. Additionally, the gradual and nonabrupt transition between adjacent oblique recess portions 26 and 36 provided by the apexes and valleys of a sinusoidal configuration prevents the occurrence of stress and fatigue points within the resilient material received within these portions of the recess. This is of significant value in a vibration dampener of the rotary type wherein a wide range of frequencies are imposed upon the dampener.

In the practice of the invention, it is preferable that the axial width of the groove or recess 24 or 34 be no more than 20% of the axial width of the associated hub or inertia member. In fact, in the commercial embodiment of the invention having the smallest axial dimension of hub and inertia member, the groove is .100 inch in axial width and comprises 16.1% of the axial width of the associated hub and inertia member. By limiting the ratio of the width of the groove to the axial width of the associated surface the "tuning" characteristics of the elastic member 38 are not adversely affected. Rotating vibration dampeners are "tuned" to absorb given frequency ranges of vibration and such "tuning" is largely determined by the characteristics of the elastic member such as the degree of elasticity, hardness, radial thickness and internal stresses. Thus, if the stresses in too much of the elastic member 38 are relieved due to being received in a groove 24 or 34, "tuning" problems occur. Additionally, the efficiency of the "keying" action produced by the relieved elastic material received within the recesses 24 and 34 is reduced if the relieved elastic material portions are not bounded by significant portions of elastic material which is under stress due to the confinement between surfaces 22 and 30.

FIG. 4 illustrates another embodiment of the invention wherein the inertia member is provided with the sinusoidal groove 34' and the hub member is provided with a rib 40 extending from the surface 22' in opposed relation with the groove. Of course, the rib member may be formed on the inertia member and the groove on the hub, if desired. In the embodiment of FIG. 4, the rib member is of a sinusoidal configuration similar to that of the grooves of FIG. 1 and is of the identical configuration of groove 34', and defines abutment shoulders for cooperation with the resilient material by having the shoulders project from the surface rather than defined as recessed depressions.

It will be appreciated that other embodiments of the invention may be apparent to those skilled in the art without departing from the spirit and scope thereof, and it is intended that the invention be defined only by the following claims.

I claim:

1. In a vibration dampener, a hub member having an axis of rotation and an outer surface concentric to said axis, an annular inertia member circumscribing said outer surface and having an inner surface concentric to, and radially spaced from, said outer surface, an elastic ring having a normal radial thickness greater than the radial thickness of the spacing between said hub and inertia members interposed between said outer and inner surfaces under tension maintaining said hub, ring and inertia members in assembled relation, said tension within said elastic ring being primarily in an axial direction with respect to said surfaces, and a continuous annular groove of sinusoidal configuration defined in at least one of said surfaces, said groove comprising adjacent portions obliquely related to each other and to said axis of rotation interconnected by an arcuate portion, said groove including opposed radially extending surface portions intersecting the associated surface and extending about the circumference of the associated surface, the axial width of said groove being substantially less than the axial width of said inner and outer surfaces and ring, the radial depth of said groove being sufficient to permit the portions of said ring axially aligned with said groove to expand into said groove relieving the tension stresses in said ring portion within said groove providing a keying portion placing the unrelieved ring portions in shear relation with the localized keying portions, thereby resisting both relative axial and rotative displacement of said ring, hub, and inertia member.

2. In a vibration dampener as in claim 1, wherein a groove of sinusoidal configuration extending about the circumference of the associated surface is defined in both the inner surface of said inertia member and the outer surface of said hub member.

3. In a vibration dampener as in claim 1, wherein the amplitude of said sinusoidal groove is slightly less than the axial width of the associated surface.

4. In a vibration dampener, a hub member having an axis of rotation and an outer surface concentric to said axis, an annular inertia member circumscribing said outer surface and having an inner surface concentric to, and radially spaced from, said outer surface, an elastic ring having a normal radial thickness greater than the radial thickness of the spacing between said hub and inertia members interposed between said outer and inner surfaces under tension maintaining said hub, ring and inertia members in assembled relation, said tension within said elastic ring being primarily in an axial direction with respect to said surfaces, and a continuous annular groove of sinusoidal configuration defined within the inner surface of said inertia member and the outer surface of said hub member, said grooves comprising a plurality of adjacent portions obliquely related to each other in opposite directions with respect to the adjacent portions and obliquely related to the axis of said hub and inertia members, said adjacent oblique groove portions being interconnected by a gradually curved arcuate portion to define a continuous annular groove configuration, said grooves including opposed radially extending surface portions intersecting the associated surface and extending about the circumference of the associated surface, the axial width of said grooves being no greater than 20% of the axial width of the associated surface, the radial depth of said groove being sufficient to permit the portions of said ring axially aligned with said groove to expand into said groove relieving the tension stresses in said ring portion within said groove providing a keying portion placing the unrelieved ring portions in shear relation with the localized keying portions, thereby resisting both relative axial and rotative displacement of said ring, hub, and inertia member.

5. In a vibration dampener, a hub member having an axis of rotation and an outer surface concentric to said axis, an annular inertia member circumscribing said outer surface and having an inner surface concentric to, and radially spaced from, said outer surface, an elastic ring having a normal radial thickness greater than the radial thickness of the spacing between said hub and inertia members interposed between said outer and inner surfaces under tension maintaining said hub, ring and inertia members in assembled relation, said tension within said elastic ring being primarily in an axial direction with respect to said surfaces, and a groove defined within the inner surface of said inertia member and the outer surface of said hub member, said grooves comprising a plurality of adjacent portions obliquely related to each other in opposite directions with respect to the adjacent portions and obliquely related to the axis of said hub and inertia members, said adjacent oblique groove portions being interconnected by a gradually curved arcuate portion to define a continuous annular groove configuration, said grooves including opposed radially extending surface portions intersecting the associated surface and extending about the circumference of the associated surface, the axial width of said grooves being substantially less than the axial width of the associated surface, the radial depth of said groove being sufficient to permit the portions of said ring axially aligned with said groove to expand into said groove relieving the tension stresses in said ring portion within said groove providing a keying portion placing the unrelieved ring portions in shear relation with the localized keying portions, thereby resisting both relative axial and rotative displacement of said ring, hub, and inertia member.

6. In a vibration dampener as in claim 5, wherein the axial width of said grooves is no greater than 20% of the axial width of the associated surface.

7. In a vibration dampener as in claim 5, wherein said grooves are of a uniform configuration throughout their length, said oblique and arcuate portions defining a groove having a uniform frequency and amplitude, said amplitude of said grooves being slightly less than the axial width of the associated surface.

8. In a vibration dampener, a hub member having an axis of rotation and an outer surface concentric to said axis, an annular inertia member circumscribing said outer surface and having an inner surface concentric to, and radially spaced from, said outer surface, an elastic ring having a normal radial thickness greater than the radial thickness of the spacing between said hub and inertia members interposed between said outer and inner surfaces under tension maintaining said hub, ring and inertia members in assembled relation, said tension within said elastic ring being primarily in an axial direction with respect to said surfaces, and an annular groove defined in one of said surfaces, said groove including opposed radially extending surface portions intersecting the associated surface and of a sinusoidal configuration extending in both circumferential and axial relation to the associated surface, an annular rib projecting from the other surface of a sinusoidal configuration corresponding to that of said groove extending in both circumferential and axial relation to said other surface, said rib being in radially opposed and axially aligned relation to said groove whereby said rib maintains the portion of said elastic ring aligned with said groove within said groove placing the ring portion within said groove in shear relation to the nongroove-received ring portions thereby resisting both relative axial and rotative displacement of said ring, hub, and inertia member.

9. In a vibration dampener as in claim 8, wherein the axial width of said groove is no greater than 20% of the axial width of the associated surface.

References Cited by the Examiner
UNITED STATES PATENTS

| | | | |
|---|---|---|---|
| 1,959,256 | 5/1934 | Zerk | 287—85 |
| 1,982,983 | 12/1934 | Czemba | 82—102 |
| 2,000,129 | 5/1935 | Dunnam | 82—102 |
| 2,795,036 | 6/1957 | Haushalter | 74—574 |

FOREIGN PATENTS 847,549  9/1960  Great Britain.

FRED C. MATTERN, Jr., *Primary Examiner.*

W. S. RATLIFF, Jr., *Assistant Examiner.*

BROUGHTON G. DURHAM, *Examiner.*